United States Patent [19]

Arbisi et al.

[11] Patent Number: 4,680,148
[45] Date of Patent: Jul. 14, 1987

[54] MOBILE POND AERATING SYSTEM

[75] Inventors: Dominic S. Arbisi, Minnetonka; Coy E. Replogle, Minneapolis, both of Minn.

[73] Assignee: Aeras Water Resources, Inc., Eden Prairie, Minn.

[21] Appl. No.: 739,291

[22] Filed: May 30, 1985

[51] Int. Cl.⁴ .............................................. B01F 3/04
[52] U.S. Cl. ................... 261/120; 210/242.2; 261/121.1; 441/21; 441/22
[58] Field of Search ........... 261/120, 121 R, DIG. 75, 261/DIG. 79; 210/242.2, 242.1; 114/144 A; 119/3, 5; 441/21, 22; 440/84, 87; 372/107; 340/825.72, 825.73

[56] References Cited

U.S. PATENT DOCUMENTS

| | | | |
|---|---|---|---|
| 3,589,997 | 6/1971 | Grutsch et al. | 261/120 X |
| 3,691,978 | 9/1972 | Bond | 114/144 A |
| 3,732,013 | 5/1973 | Hieslmair et al. | 372/107 X |
| 3,756,578 | 9/1973 | McGurk | 210/242.2 X |
| 3,796,058 | 3/1974 | Jones et al. | 114/144 A X |
| 3,953,905 | 5/1976 | Paitson | 441/22 X |
| 4,215,082 | 7/1980 | Danel | 261/120 X |
| 4,229,302 | 10/1980 | Molvar | 261/120 X |
| 4,268,398 | 5/1981 | Shuck et al. | 261/120 X |
| 4,270,307 | 6/1981 | Arigaya | 440/84 X |
| 4,278,948 | 7/1981 | Evtuhov | 372/107 X |
| 4,499,582 | 2/1985 | Karning et al. | 372/107 X |

*Primary Examiner*—Richard L. Chiesa

[57] ABSTRACT

A system for aerating in a programmed manner the desired areas of a water pond to enhance the environment for marine life in the pond; said system including a propelled boat with an aerator mounted thereon and having direction control apparatus including a rotating beam-sending component, a plurality of beam-reflecting posts located in predetermined fixed relationship around the shore line of the pond, and a beam-receiving component mounted on the boat to receive the beam reflected back from each of the reflecting posts, whereby the position of the boat can be determined automatically by angle determining components combined with a microprocessor programmed to calculate by triangulation computation the position of the boat and produce a signal which is connected to a servo system which controls the direction of travel of the boat in its aerating path around the pond.

3 Claims, 4 Drawing Figures

MOBILE POND AERATING SYSTEM

SUMMARY OF THE PRESENT INVENTION

This invention provides an automatic programmed system for discharging a highly oxygenated water and air flow from a boat into the water in a pond to aerate an entire area of the Pond in a predetermined programmed manner. The control system includes a locating system which incorporates a signal-sending component such as a rotating laser beam source combined with a plurality of reference reflectors and a rotating reflected beam receiver which produces a signal which is delivered to a microprocessor programmed to provide a location indicating signal which actuates a steering control mechanism to correct the course of the boat.

DESCRIPTION OF THE PREFERRED EMBODIMENT

Figure 1:
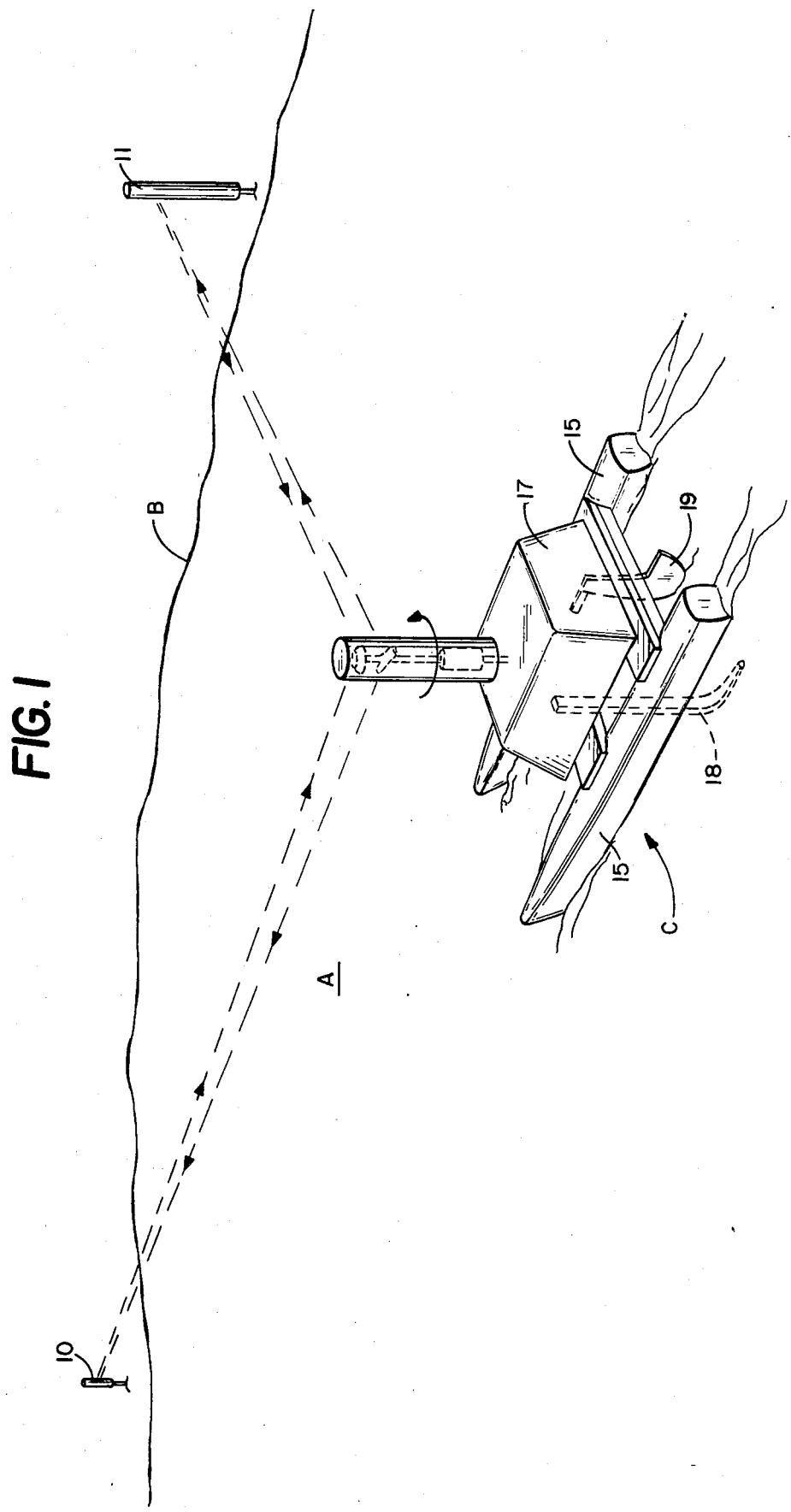
FIG. 1 is a perspective view of a pond showing diagrammatically an aerating and control system embodying this invention.
Figure 2:
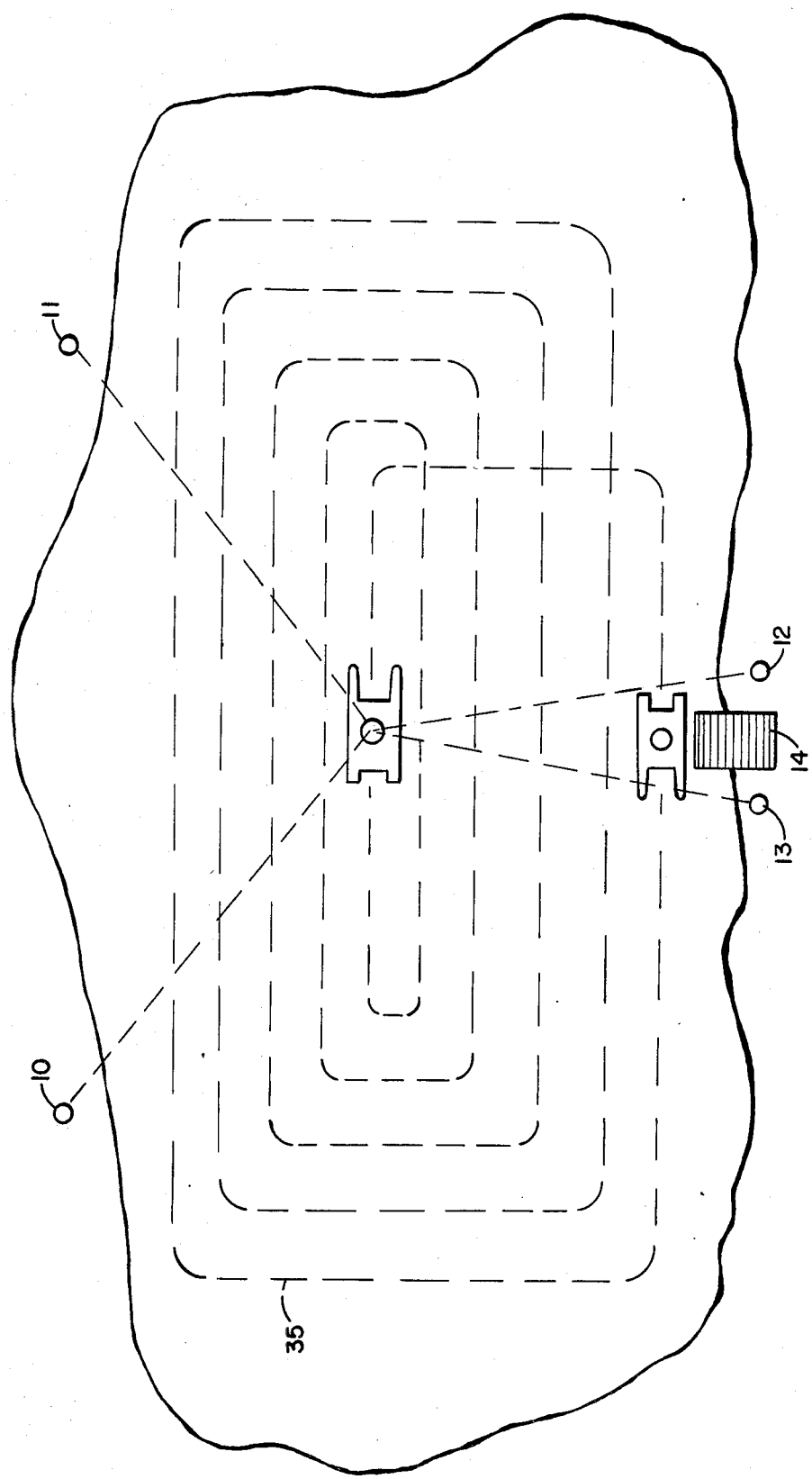
FIG. 2 is a top plan view of the pond shown in FIG. 1 and showing a typical path of travel for the aerating boat.
Figure 3:
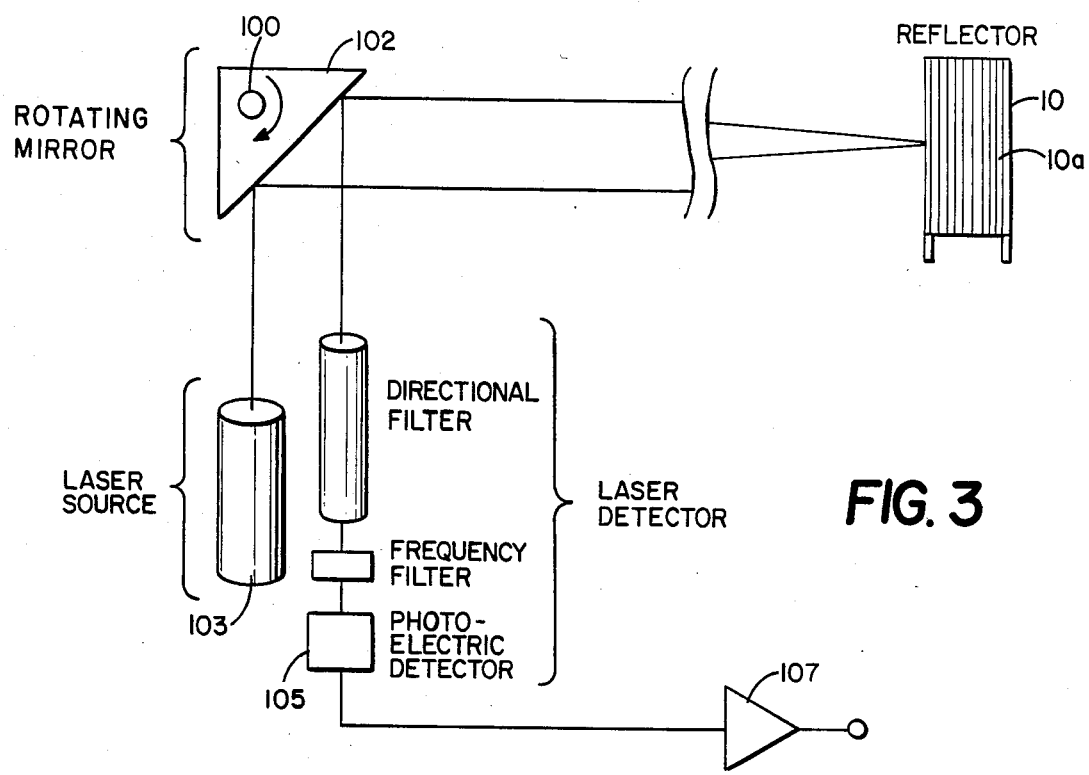
FIG. 3 is a diagrammatic view of the laser sending and receiving apparatus.
Figure 4:
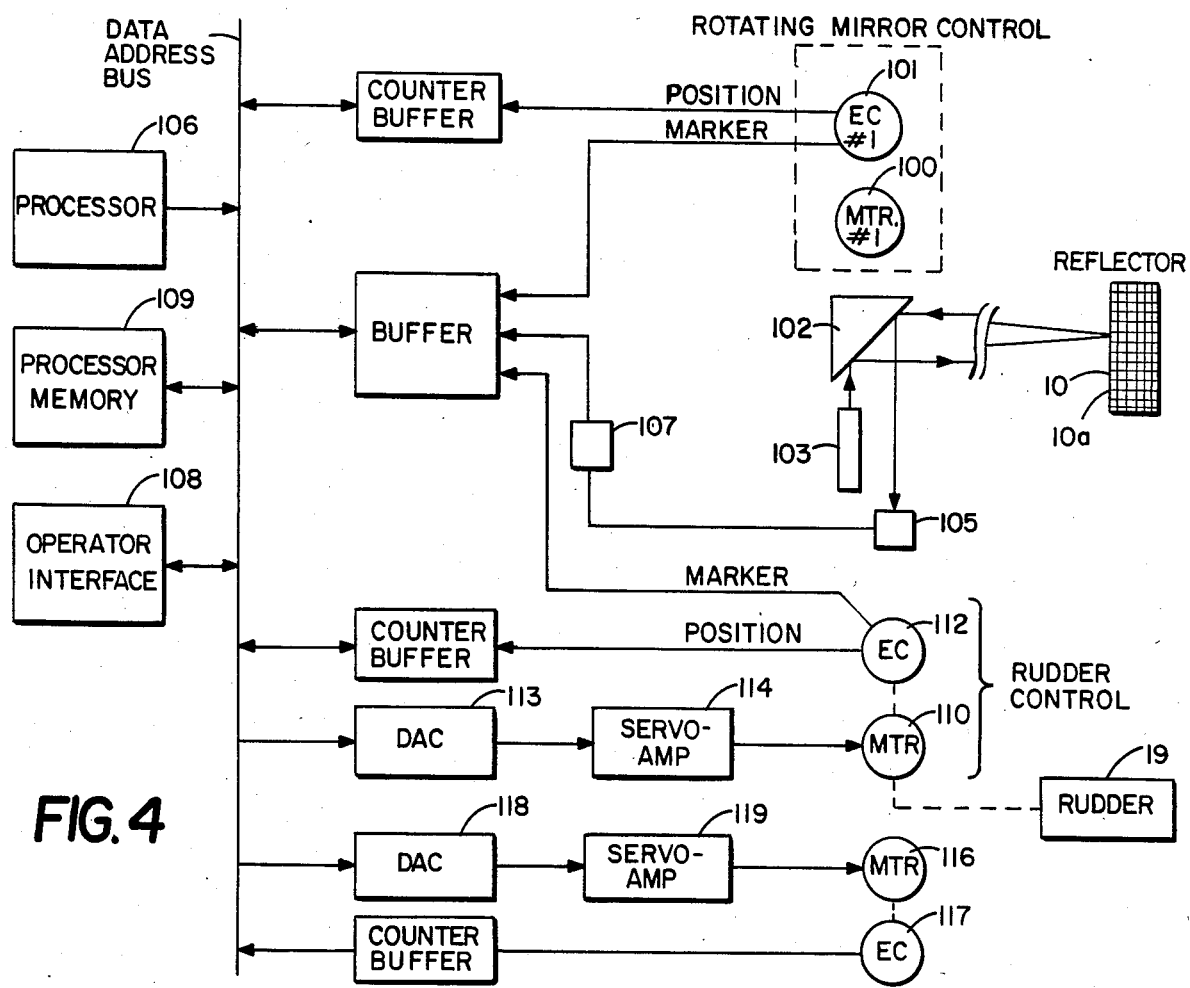
FIG. 4 is a diagrammatic view of the directional and speed control mechanisms.

FIG. 1 is a diagrammatic view of our aerating system and shows a body of water A with a shoreline B on which four reflector posts 10, 11, 12, and 13 (shown in FIGS. 1 and 4) are mounted in fixed, upstanding relation. All four reflector posts are of identical construction and each includes a plurality of mirror segments shown in FIGS. 3 and 4 in which post 10 is identified and the mirror segments are identified by the reference character 10a as being typical of the construction of all four posts. Each post will be positioned vertically and the mirror segments mounted thereon will all lie in a vertical plane, so that the horizontal beams from a laser generator on the boat (to be described) will be reflected back horizontally. A suitable boat such as the pontoon boat C is provided, having a pair of pontoons 15 with a suitable housing 17 mounted thereon. The housing includes a power plant and system for producing an aerating discharge through a nozzle 18 shown by dotted lines in FIG. 1. The power plant and nozzle disclosed and claimed in copending application for U.S. Pat. No. 4,522,151 (Ser. No. 475,074, filed Mar. 14, 1983), invented by Dominic S. Arbisi and Coy E. Replogle, has proved satisfactory for this purpose. In the form of the invention shown, the aerating jet discharge from the nozzle 18 forms the propelling force for moving the boat C around the pond. A rudder 19 is provided to steer the boat C. FIG. 2 illustrates a typical aeration path which is represented by the dotted lines 35.

CRAFT LOCATING MECHANISM

The craft locating mechanism includes an electric motor 100 which rotates a mirror 102 at a selected suitable rotational velocity such as approximately one revolution per second. A laser beam is emitted from a suitable laser source 103 such as a helium-neon laser identified as Model 1108 and manufactured by Uniphase Corporation of Sunnyvale, Calif. and is reflected by the rotating mirror 102 in a horizontal direction, which in turn, is reflected back to the rotating mirror by the respective reflector posts 10, 11, 12, and 13. When the beam reflected back from the post again strikes the rotating mirror 102, it will be reflected vertically into a suitable photoelectric detector 105 such as a red optimized photo diode identified as Model OSD 100-2 manufactured by Centronic, Inc., of Mountain Side, N.J. The signal output of the detector 105 is amplified by amplifier 107 and is then read by the microprocessor 106. A suitable encoder-counter 101 such as an optical incremental encoder identified as Model VOE-11 manufactured by Vernitech, a division of Vernitron Corporation of Deer Park, N.Y., is connected to the rotating mirror 102 to produce a signal which indicates the the angular position of the rotating mirror 102 at the time the return reflected beam was received. This produces a first locating signal. Since the mirror 102 is rotating through complete 360 sweeps during each revolution, the reflected beam back from the successive reflector posts 10, 11, 12, and 13 will locate the angular relationship between each post and the craft and will thus permit the microprocessor 106 to calculate, by its triangulation program, the position of the craft at each second of time during its travel around the programmed course.

CRAFT DIRECTION CONTROL MECHANISM

The desired path of travel for the boat C is preprogrammed into the processor 106 through the operator interface 108 and will be stored in the processor memory 109 of the microprocessor. This programmed path in the microprocessor 106 will produce a reference signal at any moment of time to indicate the desired position of the craft at that moment. The signal produced by the craft locating mechanism described above will then be compared to the desired position in the microprocessor and the increment of error obtained by subtracting the two signals will produce a control signal fo returning the craft toward its desired path of travel.

In order to establish the orientation of the boat, that is, the direction it is pointing, a home base reference must be established. The home base location is identified by the reflective posts 12 and 13 of FIG. 2 which are located in close proximity and which will be separated by only a small angular differential between those two reference posts. When the direction the boat is pointing relative to the home base location, the microprocessor will then produce the necessary corrective signal response. The difference between the actual course direction and the desired course direction is calculated by the microprocessor 106 and the signal will be used to control the position of the rudder 19 by its reversible servomotor 110. The error indicating signal in the course direction will be converted into a digital word by the processor 106 and will be fed into a digital-analog converter (DAC) 113. The output from the DAC is amplified by amplifier 114 and is then fed to the reversible motor control servomotor 110. As the motor 110 rotates, the position of the rudder 19 will be adjusted to cause the craft to correct its direction toward the desired course. The rotary position of the motor 110 is monitored by the microprocessor 106 by means of an encoder/counter 112 which is coupled to the rudder motor 110 and the micro-processor 106 will, of course, maintain the rudder position whenever the boat is on course.

CRAFT VELOCITY CONTROL MECHANISM

The microprocessor 106 will also calculate the velocity of the craft by comparing the craft's actual position at two points in time and dividing the difference by the time that has elapsed:

$$\text{velocity} = \frac{\text{position } t1 - \text{position } t0}{t1 - t0}$$

The microprocessor 106 will then compare this actual velocity with a pre-programmed velocity stored in memory 109. The difference between actual and desired velocity is the velocity error and will be used as the basis for the velocity control device. The velocity error is converted into a digital word by the microprocessor 106 and is written into a digital-analog converter 118. The output of the DAC 118 is amplified by amplifier 119 and fed to the velocity control servomotor 116 to energize the motor. The rotary position of the motor 116 is accessed by the microprocessor 106 via the counter/encoder 117 coupled to the servomotor 116. When the craft C is traveling at the desired velocity, the velocity error will be zero and the resulting digital word will be zero and the servomotor 116 will stop.

It is to be understood that while there has been illustrated and described certain forms of the present invention, the invention is not to be limited to the specific form or arrangement of parts herein described and shown except to the extent that such limitations are found in the claims.

What is claimed is:

1. An aerating system for aerating substantially all areas of a pond of water surrounded by a bordering shoreline, said system comprising:
a self-propelled flotation unit,
a subsurface aerating discharge nozzle mounted on said unit for discharging aeration gas into the water below the surface thereof,
programmed means mounted on board the unit free from any connection with the shoreline for guiding and propelling the flotation on the water surface in a substantially predetermined path so that the aerating discharge for the nozzle effectively distributes the aerating gas to substantially all areas of the pond with complete freedom of controlled movement without restraints connected to the shoreline,
said electronic control system comprising a sending, computing and automatic control of the direction and speed of the unit and which includes a laser beam timed transmitting device also mounted on the flotation unit combined with a plurality of reflecting mirrors mounted in fixed relation to the shore line of the pond to produce a flotation unit orienting signal, means on board the unit for sensing the orienting signal to determine the angular position of the flotation unit, said electronic control system automatically varying the direction of travel of said unit to be controlled in accordance with the sensed position of the unit.

2. The structure set forth in claim 1 which includes a plurality of fixed stationary reflector members for receiving and reflecting the laser beam transmitted from said flotation unit and means for rotating the laser beam transmitter through 360 degrees required orientation data for the electronic control system to constantly monitor the position of the flotation unit and guide the propulsion thereof around the pond.

3. The structure set forth in claim 1 and means mounted on said flotation unit for supplying energy for the laser beam transmitter, the propulsion power for the unit, and the directional control apparatus.

* * * * *